(12) United States Patent
Larson

(10) Patent No.: US 7,308,206 B2
(45) Date of Patent: Dec. 11, 2007

(54) HEATSINKING OF OPTICAL SUBASSEMBLY AND METHOD OF ASSEMBLING

(75) Inventor: Eric R. Larson, Boulder, CO (US)

(73) Assignee: Finisar Corporation, Sunnyvale, CA (US)

( * ) Notice: Subject to any disclaimer, the term of this patent is extended or adjusted under 35 U.S.C. 154(b) by 573 days.

(21) Appl. No.: 10/761,106

(22) Filed: Jan. 20, 2004

(65) Prior Publication Data

US 2005/0158052 A1 Jul. 21, 2005

(51) Int. Cl.
*H04B 10/00* (2006.01)
*G02B 6/12* (2006.01)
*G02B 6/36* (2006.01)
*H05K 7/20* (2006.01)

(52) U.S. Cl. .............. 398/164; 398/135; 398/138; 385/14; 385/92; 361/702

(58) Field of Classification Search .............. 361/704, 361/702, 687; 385/902, 88, 14, 31, 60, 66, 385/78, 72; 398/135, 138, 164
See application file for complete search history.

(56) References Cited

U.S. PATENT DOCUMENTS

| 4,547,039 | A | 10/1985 | Caron et al. |
| 5,032,898 | A | 7/1991 | Bowen et al. |
| 5,631,987 | A | 5/1997 | Lasky et al. |
| 6,200,041 | B1 | 3/2001 | Gaio et al. |
| 6,445,475 | B1 | 9/2002 | Okubora et al. |
| 6,526,206 | B2 | 2/2003 | Kunkel et al. |
| 6,655,855 | B2 | 12/2003 | Nakura et al. |
| 6,659,657 | B2 | 12/2003 | Lin et al. |
| 2003/0180012 | A1* | 9/2003 | Deane et al. ............. 382/92 |
| 2004/0062491 | A1* | 4/2004 | Sato et al. ............... 385/88 |
| 2005/0007741 | A1* | 1/2005 | Ice et al. ................. 361/704 |

FOREIGN PATENT DOCUMENTS

| EP | 0 678 765 | 10/1995 |
| EP | 1 227 349 | 7/2002 |
| EP | 1 237 025 | 9/2002 |
| JP | 56030111 | 3/1981 |

* cited by examiner

*Primary Examiner*—Dalzid Singh
(74) *Attorney, Agent, or Firm*—Workman Nydegger

(57) ABSTRACT

An optical transceiver has a housing, a circuit board, an optical subassembly and a heat wick. The circuit board is configured to be received within the housing. The optical subassembly has a can and a barrel, and the optical subassembly is mechanically supported on the housing and electrically coupled to the circuit board. The heat wick is thermally coupled between the can of the optical assembly and the housing.

16 Claims, 5 Drawing Sheets

US 7,308,206 B2

HEATSINKING OF OPTICAL SUBASSEMBLY AND METHOD OF ASSEMBLING

BACKGROUND

The present invention relates to an optical subassembly. More particularly, the optical subassembly of the present invention is provided with a heat wick for effectively dispensing heat away from the optical subassembly.

An optical subassembly is typically configured to be received in a transceiver module and is used to transform optical signals coming from optical fibers to an electrical signal, or to transform an electrical signal to an optical signal. A photodiode or similar optical receiver contained by the optical subassembly transforms the optical signal to the electrical signal and then sends the electrical signal to a processing circuit. A laser diode, pin diode or similar optical emitter contained within the optical subassembly transforms the electrical signal coming from the processing circuit to the optical signal.

The process of converting optical signals to electrical signals and electrical signals to optical signals generates significant heat in the optical subassembly. This generated heat can cause damage to the optical subassembly, to the laser diode and to photodiodes contained in the subassembly and problems for the materials holding the various components together. For example, certain epoxies, solder, or other bonding materials can be negatively affected by significant heat generation in the optical subassembly. An improvement in the art is needed.

SUMMARY

The present invention is an optical transceiver. The optical transceiver has a housing, a circuit board, an optical subassembly and a heat wick. The circuit board is configured to be received within the housing. The optical subassembly has a can and a barrel, and the optical subassembly is mechanically supported on the housing and electrically coupled to the circuit board. The heat wick is thermally coupled between the can of the optical assembly and the housing.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
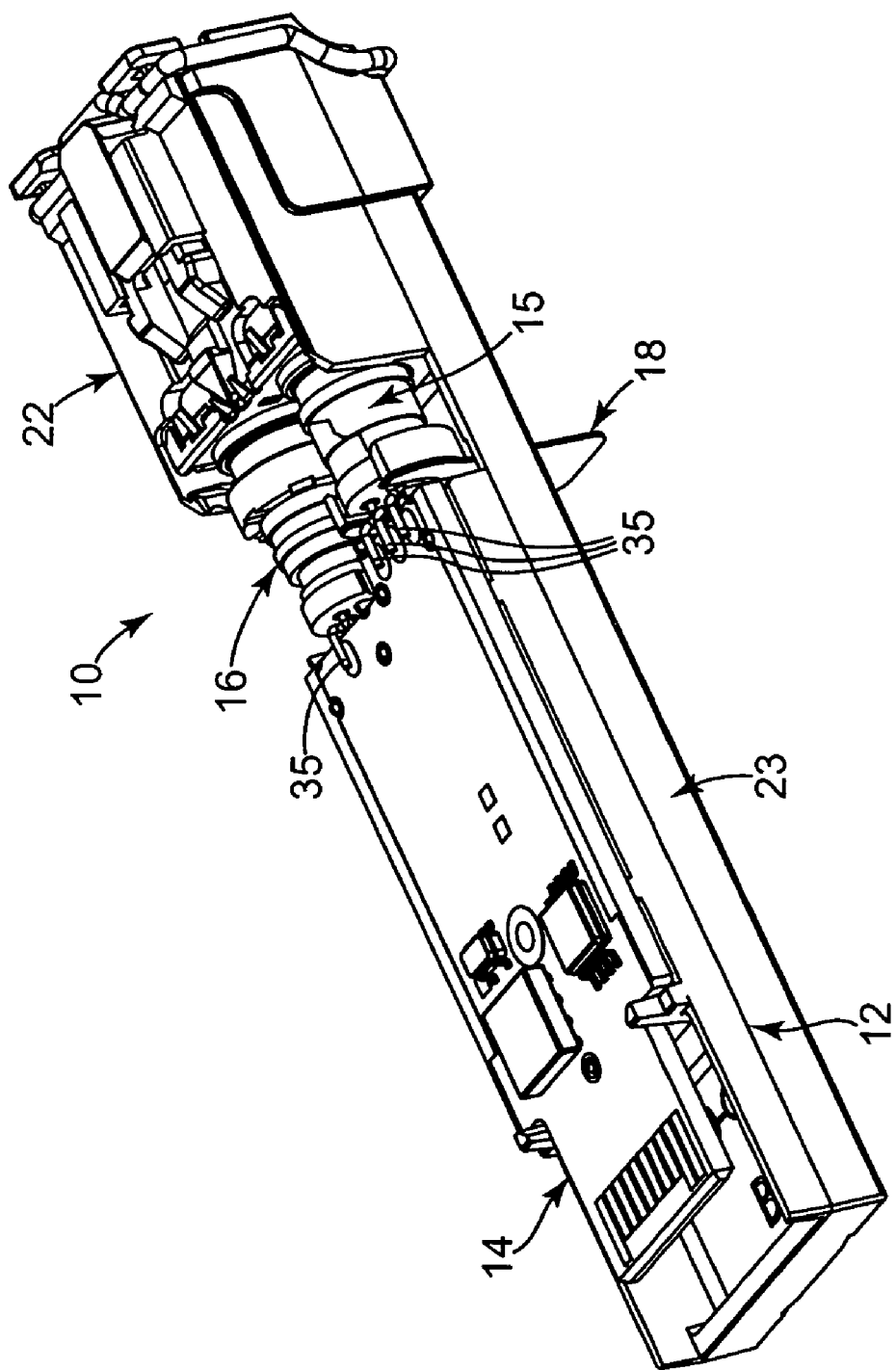
FIG. 1 is a perspective view of a transceiver module including an optical subassembly and heat wick in accordance with the present invention.

FIG. 1 illustrates transceiver module 10 in accordance with the present invention. Transceiver module 10 includes housing 12, printed circuit board 14, first optical subassembly 15, second optical subassembly 16, and heat wick 18. In operation, the various components of transceiver module 10 are assembled and then connected to optical connectors, such a fiber optic cable, on one side and to a host system, such as a router, computer or other electrical device, on another. Transceiver module 10 then transforms electrical signals to optical signals and/or transforms optical signals into electrical signals. Most often, two optical subassemblies 15 and 16 are placed within transceiver module 10, one a transmit subassembly and one a receive subassembly. It is also possible to have a single optical subassembly in accordance with the present invention as well.

Housing 12 includes a nose portion 22 and a frame portion 23. Printed circuit board 14 is mounted to frame portion 23 and optical subassemblies 15 and 16 are mounted between circuit board 14 and nose portion 22. Optical subassemblies 15 and 16 are mounted such that one end of each can be coupled to the circuit board 14 and another end of each couples into nose portion 22. Optical subassemblies 15 and 16 may be secured by a seat or nest on frame portion 23 such that they are mechanically supported on housing 12.

Circuit board 14 carries various components thereon. Typically, these components include semiconductor chips and related electrical circuitry that facilitate the processing of electrical and optical signal conversion. Optical subassemblies 15 and 16 illustrated in FIG. 1 include leads 35 projecting from the subassemblies that are connected directly to circuit board 14. Alternatively, flex leads (not shown in FIG. 1) that are made of a conducting material can be used and configured to electrically couple circuit board 14 with optical subassemblies 15 and 16.

One of optical subassemblies 15 and 16 functions as an optical transmitter and the other functions as an optical receiver, and each include subassembly leads 35. Leads 35 are electrically coupled to circuit board 14 when transceiver module 10 is fully assembled. Optical subassemblies 15 and 16 may include a photodiode or similar optical receiver, for transforming optical signals to electrical signals. Optical subassemblies 15 and 16 may also, or alternatively, include a laser, pin diode, or a similar optical emitter for transforming electrical signals to optical signals. In one alternative embodiment, a single optical subassembly is used, the single optical subassembly being a bidirectional optical subassembly. In this case, the components for both transmitting and receiving are contained within the single optical subassembly. Whether an optical subassembly is functioning as an optical transmitter or as an optical receiver, it will contain some sort of optoelectronic device, such as a photodiode or a laser. Consequently, it will generate significant heat during operation.

Heat wick 18 is configured to be assembled to optical subassembly 15 and/or to optical subassembly 16 in accordance with the present invention. When completely assembled, heat wick 18 conductively couples optical assembly 15 and/or 16 with housing 12. Heat wick 18 thereby provides an efficient thermal path from optical assembly 15 and/or 16, which tend to be hot, to housing 12, which tends to be relatively cooler. Heat wick 18 is configured to be flexible thereby providing variable position control.

Figure 2:
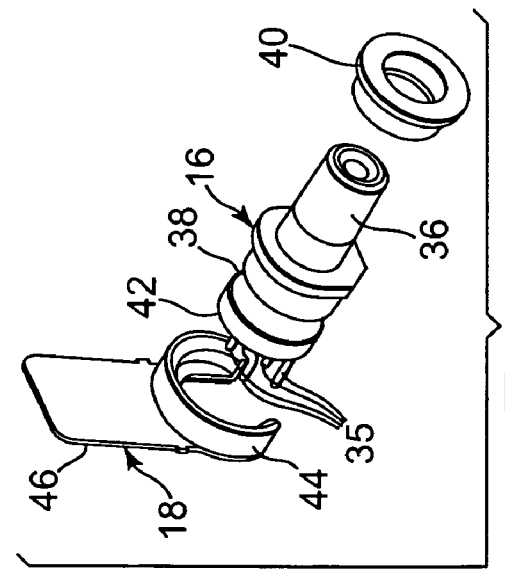
FIG. 2 illustrates an exploded view of an optical subassembly and heat wick in accordance with the present invention.

FIG. 2 illustrates optical subassembly 16 and heat wick 18 in accordance with the present invention. Heat wick 18 is also connectable to optical subassembly 15 in the same way, but for succinctness of description, a single subassembly will be illustrated. Optical subassembly 16 includes subassembly barrel 36 and optical can 38. Optical can 38 includes end surface 42. Barrel collar 40 is configured to be placed over subassembly barrel 36. Optical can 38 is a cylindrical can containing a laser or pin diode used for optical conversion. Typically, there is also a lens over the top of the laser or diode such that optical can 38 forms a thematic enclosure.

Optical subassembly 16 is assembled by coupling optical can 38 to subassembly barrel 36. Subassembly barrel 36 is typically plastic or stainless steel. Subassembly barrel 36 must be optically aligned with optical can 38. Consequently, the final alignment dimensions of optical subassembly 16 will not be determined until optical can 38 and subassembly barrel 36 have been optically aligned, typically using a laser-welding process. Subassembly leads 35 extend from the end surface 42 of optical can 38. Optical can 38 may be, for example, a TO-can.

With the present invention, heat wick 18 is then assembled over optical assembly 16. In one embodiment, heat wick 18 includes sleeve 44 and flange 46. Sleeve 44 is configured to compliment the external shape of optical can 38 such that heat wick 18, and specifically sleeve 44, may be readily mounted on optical can 38. In addition, flange 46 is configured to be a flexible material such that it may be bent or twisted in order to be installed in multiple configurations of transceiver module 10 in accordance with the present invention. This flexibility can be useful when the final alignment dimensions of optical subassembly 16 vary slightly based on the final optical alignment of optical can 38 and subassembly barrel 36. In this way, slight variations in the final alignment dimensions of optical subassembly 16 can be compensated for in the flexibility of heat wick 18 during its installation.

Figure 4:
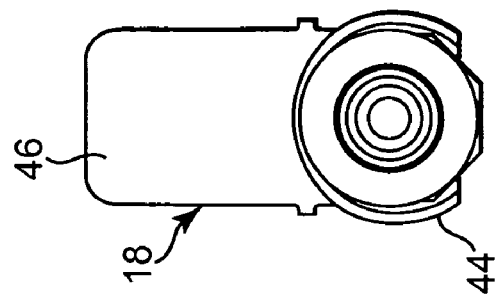
FIG. 4 illustrates an end view of an optical subassembly and heat wick in accordance with the present invention.
Figure 3:
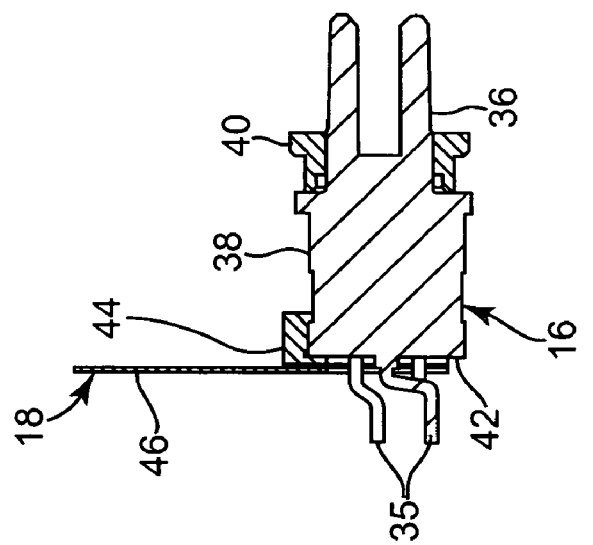
FIG. 3 illustrates a cross section of an optical subassembly and heat wick in accordance with the present invention.

FIGS. 3 and 4 illustrate heat wick 18 mounted on optical subassembly 16 in cross-sectional and end views, respectively. Optical subassembly 16 includes subassembly barrel 36 coupled to optical can 38. Heat wick 18 is mounted to optical can 38. When heat wick 18 is so mounted, there is contact between back surface 42 and a portion of heat wick 18. In addition, there is thermal contact between sleeve 44 and optical can 38. In one embodiment, heat wick 18 is fixed to back surface 42 of optical can 38 using conductive epoxy or silver-filled conductive epoxy. In other embodiments, heat wick 18 may be fixed using any of a variety of bonding materials, including solder or other forms of epoxy. It could also be coupled with a mechanical connection between back surface 42 and heat wick 18. For example, sleeve 44 could be configured as a spring clip such that it clips over optical can 38.

In one embodiment of the invention, heat wick 18 is formed of a thin copper strip. Consequently, heat wick 18 provides a very efficient thermal path away from optical subassembly 16. It is also quite flexible for attachment to housing 12. In this way, once optical subassembly 16 is mounted in housing 12 of transceiver module 10, heat wick 18 can then be installed and bent into place.

Figure 5:
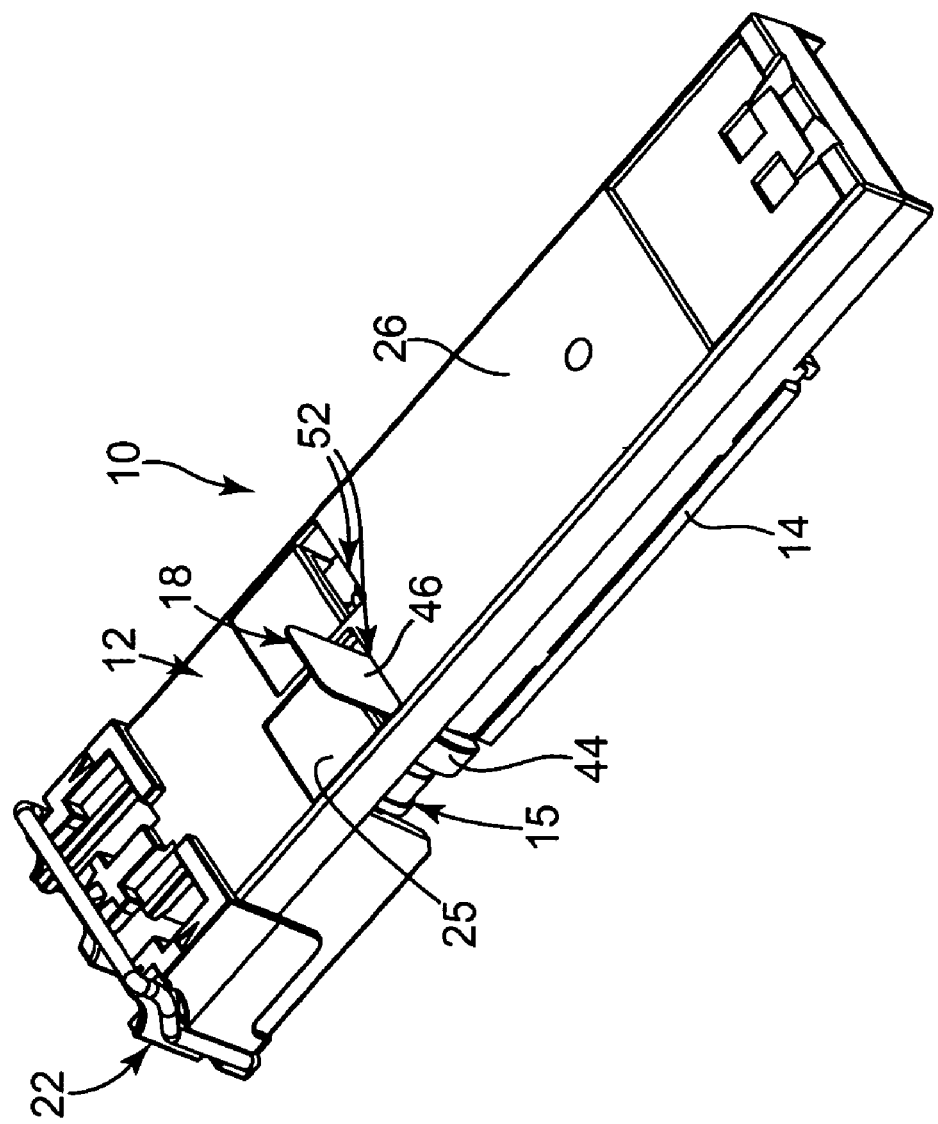
FIG. 5 illustrates a perspective view of transceiver module with optical subassembly and heat wick in accordance with the present invention.

FIG. 5 illustrates transceiver module 10 as view from the opposite side illustrated in FIG. 1. Transceiver module 10 is illustrated with circuit board 14, optical subassemblies 15 and 16 (subassembly 16 not readily visible in FIG. 5), and heat wick 18 assembled with housing 12. Optical subassemblies 15 and 16 are typically fixed to circuit board 14 and the combined assembly is mounted onto frame portion housing 12. Once optical subassembly 16 is installed in housing 12, heat wick 18, which has been fixed to end surface 42, can be thermally coupled to housing 12 in a variety of ways. For example, flange 46 of heat wick 18 may project through a slot 52 provided in housing surface 26. Furthermore, housing surface 26 may also have a recess 25 into which flange 46 may be received when it is bent over housing 12. Flange 46 may then be fixed to recess 25 in a variety of ways. For example, a piece of material may be stamped over flange 46 onto housing 12 to hold flange 46 into recess 25. Similarly, various epoxies and/or solders could be used to fix flange 46 to housing 12.

Optical subassembly 16 and circuit board 14 are assembled within transceiver module 10 such that they are mechanically secured within transceiver module 10 independently of heat wick 18. In this way, heat wick 18 is not relied upon to provide mechanical stability or support for optical subassembly 16 or circuit board 14 within transceiver module 10, but rather, only to thermally couple optical subassembly 16 to housing 12. This provides added flexibility in the assembly process in that there are no mechanical restrictions in thermally coupling optical subassembly 16 to housing 12 with heat wick 18. Since heat wick 18 is not relied upon for mechanical stability, it can be thermally coupled between optical subassembly 16 to housing 12 in a variety of ways consistent with the present invention.

Figure 6:
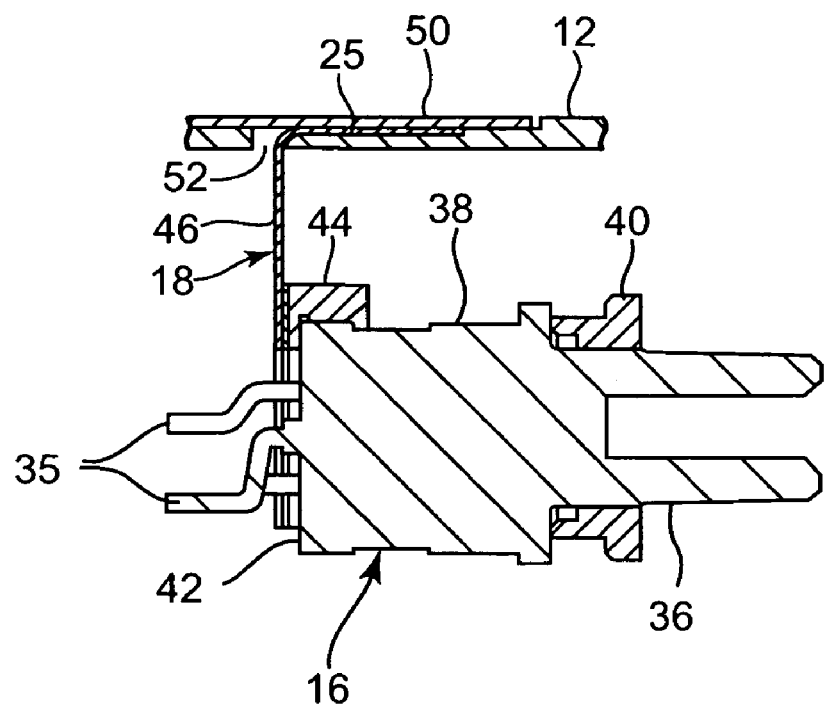
FIG. 6 illustrates a cross section of an optical subassembly and heat wick mounted to a housing in accordance with the present invention.
Figure 7:
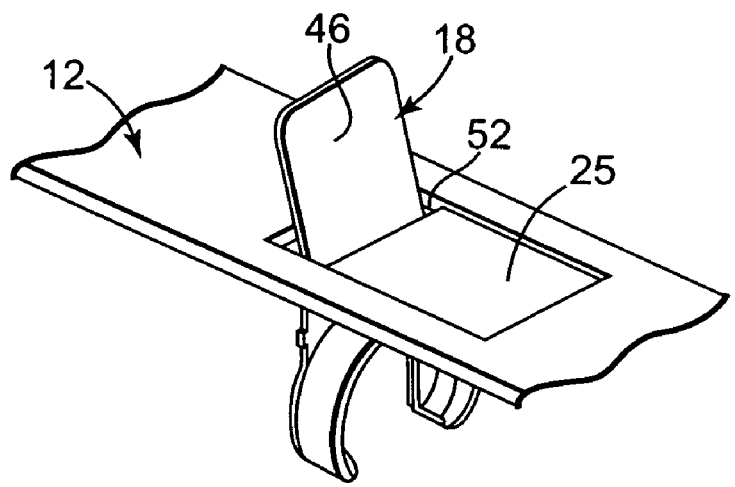
FIG. 7 illustrates a heat wick mounted to a housing in accordance with the present invention.

FIGS. 6 and 7 illustrate optical subassembly 16 being thermally coupled to housing 12 via heat wick 18. In one embodiment, slot 52 may be provided in housing 12 immediately adjacent the location where heat wick 18 is mounted to optical subassembly 16. Upon installation, heat wick 18 is directed through slot 52. Once flange 46 of heat wick 18 is extended through slot 52, it may be bent over onto the surface 26 of housing 12. A recess 25 may be provided on the surface 26 of housing 12 configured to receive flange 46 of heat wick 18. Further, a cover 50 may be provided and configured to also be received in recess 25 to secure flange 46 against housing 12.

In one embodiment, heat wick 18 has sleeve 44 and flange 46, where flange portion 46 originally extends straight up from sleeve 44 when heat wick 18 is added to optical subassembly 16. Flange 46 may be bendable so that once optical subassembly 16 is assembled on housing 12 and heat wick 18 is then added to optical subassembly 16, flange 46 may be bent over against housing 12 to make a good thermal connection. Configuring flange 46 to be flexible or bendable allows flexibility on the assembly of transceiver 10. Various configurations and combinations of housings 12, circuit boards 14, and optical subassembly 16 may be accommodated in accordance with the present invention.

For example, optically aligning can 38 and optical barrel 36 can cause variation in the physical distance that can 38 is from housing 12, as can slight design changes that exist from transceiver to transceiver. Using heat wick 18, with flexible flange 46, allows differing sizes and dimensions for housings 12, circuit boards 14, and optical subassemblies 15 and 16 to be accommodated and for flange 46 to be bent over onto housing 12 to form an effective thermal path from optical subassemblies 15 and 16 to housing 12.

Thermally coupling optical subassemblies 15 and 16 to housing 12 allows an efficient thermal path from hot optical devices to a relatively cool transceiver package. Typically, can 38, and specifically, end surface 42 of optical can 38 is the hottest portion of optical subassembly 15 and 16. Optical can 38, such as a TO-can, is typically metallic and is the focal point for heat generated in optical subassembly 15 and 16, since it contains the laser or pin diode. Fixing heat wick 18 directly to this end surface 42 wicks heat away at the highest source of heat. Housing 12 is typically a zinc die cast or similar material, which provides a good source for dissipating heat. Typically, housing 12 is the largest heat conducting element in a transceiver further adding to its good heat-dissipating characteristics. Wicking the heat away from optical subassembly 15 and 16 will improve the overall performance of transceiver 10 by keeping the laser or pin diode cooler than it would be in the absence of heat wick 18.

Although optical barrel 36 can be made of stainless steel, often it may be made of plastic or similar relatively poor conducting materials. Even where optical barrel 36 is made of stainless steel, it will not dissipate heat as well as a direct connection of heat wick 18 from end surface 42 of optical subassembly 16 to housing 12. Typically, stainless steel would have a thermal conductivity of approximately 18 watts per meter Kelvin. On the other hand, housing 12 made of zinc die cast material typically has high thermal conductivity of about 100 watts per meter Kelvin. Housing 12 is also typically a much larger size relative to optical barrel 36 thereby making a good heat sink for the heat generated within optical can 38. Heat wick 18 is typically made of copper having a conductivity of approximately 300 watts per meter Kelvin.

Figure 8:
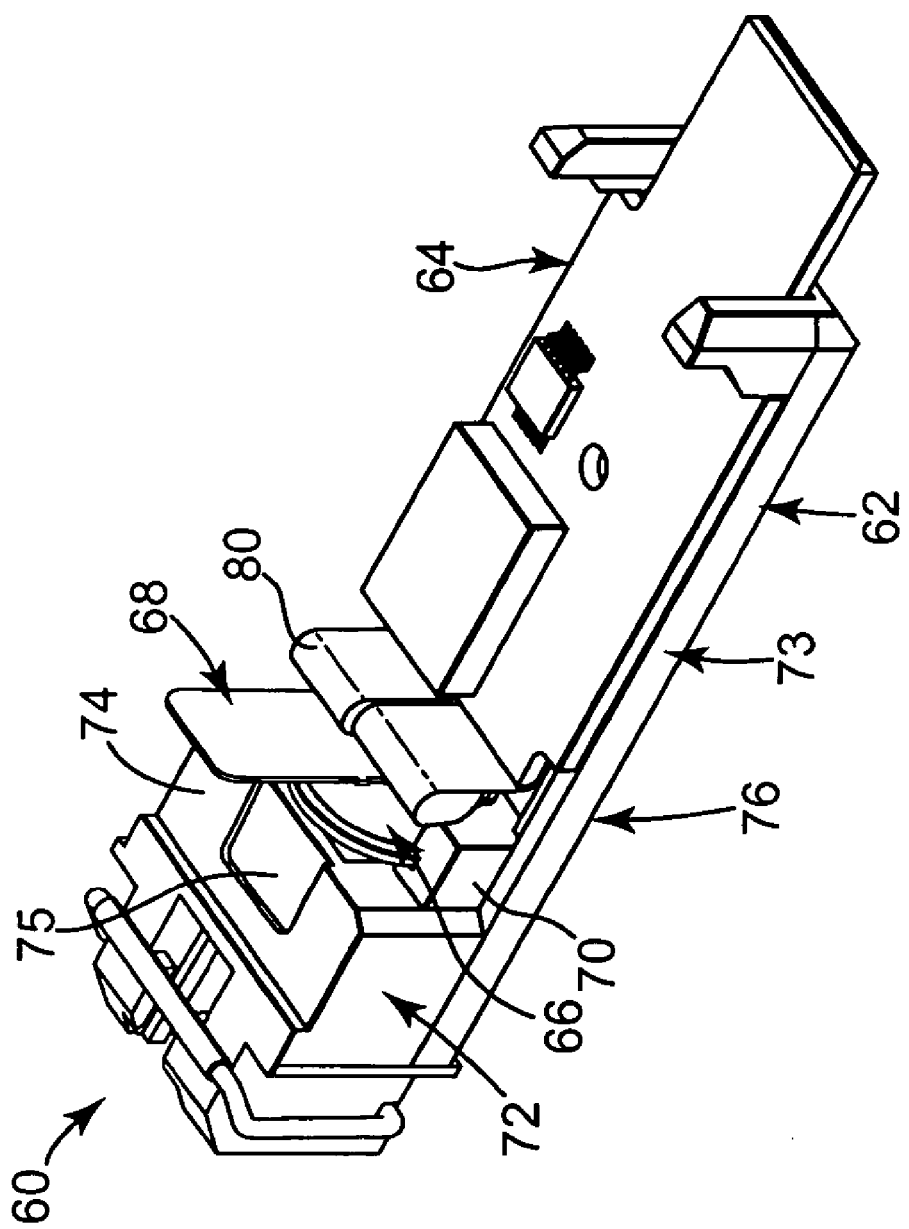
FIG. 8 illustrates a perspective view of an alternative embodiment of a transceiver module with optical subassembly and heat wick in accordance with the present invention.

FIG. 8 illustrates and alternative embodiment of transceiver module 60 with circuit board 64, optical subassembly 66, and heat wick 68 assembled with housing 62. In this embodiment, only a single optical subassembly 66 is used to receive or to transmit. As one skilled in the art will recognize, the present invention is not restricted to a particular number of optical assemblies used in the particular transceiver, or even the number of optical assemblies that are coupled to the housing with a heat wick.

During assembly of optical subassembly 66 into a device such as transceiver module 60, optical subassembly 66 is typically fixed to circuit board 64 and the combined assembly is mounted onto frame portion 73 of housing 62. Optical subassembly 66 is configured to rest in seat 70 and to extend into nose 72 such that a fiber cable connector can interface therewith. After optical subassembly 66 is installed in housing 62, heat wick 68, which has been fixed to an end surface of optical subassembly 66, can be thermally coupled to housing 62 in a variety of ways. For example, a top portion of heat wick 68 may be bent over nose 72 once optical subassembly 66 is fixed in seat 70. Recess 75 may be provided into which the top portion of heat wick 68 may be received when it is bent over nose 72. The top portion of heat wick 68 may then be fixed to recess 75 in a variety of ways. For example, a piece of material may be stamped over heat wick 68 onto nose surface 74 to hold heat wick 68 onto nose 72. Similarly, various epoxies and/or solders could be used to fix heat wick 68 to nose 72.

Optical subassembly 66 and circuit board 64 are assembled within transceiver module 60 such that they are mechanically secured within transceiver module 60 independently of heat wick 68. In transceiver 60 illustrated in FIG. 8, optical subassembly 66 is mechanically secured to transceiver module 60 via nest 70. In this way, heat wick 68 is not relied upon to provide mechanical stability or support for optical subassembly 66 or circuit board 64 within transceiver module 60, but rather, only to thermally couple optical subassembly 66 to housing 62. This provides added flexibility in the assembly process in that there are no mechanical restrictions in thermally coupling optical subassembly 66 to housing 62 with heat wick 68. Since heat wick 68 is not relied upon for mechanical stability, it can be thermally coupled between optical subassembly 66 to housing 62 in a variety of ways consistent with the present invention.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An optical transceiver comprising:
   a housing;
   a circuit board configured to be received within the housing;
   an optical subassembly having a can and a barrel, the optical subassembly mechanically supported on the housing and electrically coupled to the circuit board; and
   a heat wick thermally coupled between the optical assembly and the housing,
   wherein the heat wick includes a sleeve and a flange, the sleeve configured to fit over the can of the optical subassembly and the flange configured to be coupled with the housing such that the can of the optical subassembly is thermally coupled directly to the housing.

2. The optical transceiver of claim 1, wherein the optical subassembly is mechanically supported on the housing independently of the connection of the heat wick between the optical subassembly and the housing.

3. The optical transceiver of claim 2, wherein the optical subassembly is mechanically supported by a nest on the housing.

4. The optical transceiver of claim 1, wherein the housing includes a slot through which the flange of the heat wick extends, and wherein the flange is bent over onto a surface of the housing to thermally couple the flange to the housing.

5. The optical transceiver of claim 1 further comprising a second optical subassembly, wherein the optical subassembly includes an optical emitter for receiving electrical signals and producing responsive optical signals and wherein the second optical subassembly functions includes an optical receiver for receiving optical signals and producing responsive electrical signals.

6. The optical transceiver of claim 5 further including a second heat wick, wherein the second optical subassembly has a can and a barrel and wherein the second heat wick is thermally coupled between the can of the second optical assembly and the housing.

7. The optical transceiver of claim 5, wherein the optical receiver is a photodiode and wherein the optical emitter is a laser.

8. The optical transceiver of claim 1, wherein the heat wick is made of copper.

9. The optical transceiver of claim 1, wherein the heat wick is coupled to the can of the optical subassembly using conductive epoxy.

10. The optical transceiver of claim 1, wherein the heat wick is coupled to the can of the optical subassembly using silver-filled conductive epoxy.

11. The optical transceiver of claim 1, wherein the optical subassembly has a back surface, wherein subassembly leads project out from the back surface and are electrically coupled to the circuit board and wherein the heat wick is coupled to the back surface of the optical subassembly.

12. The optical transceiver of claim 1, wherein the transceiver is a small form factor transceiver.

13. A method for providing heat sinking in an optical transceiver, comprising the steps:
providing a transceiver housing; providing a circuit board;
electrically coupling an optical subassembly to the circuit board;
mechanically coupling the optical subassembly and the circuit board to the transceiver housing;
thermally coupling the optical subassembly to the transceiver housing using a heat wick configured to contact the optical subassembly and the transceiver housing, wherein thermally coupling the optical subassembly to the transceiver housing using a heat wick includes mounting the heat wick onto the optical subassembly after the optical subassembly has been mechanically coupled to the transceiver housing and then bending the heat wick over onto a portion of the transceiver housing to thermally couple the optical subassembly an the transceiver housing.

14. The method of claim 13, wherein the optical subassembly is mechanically supported on the transceiver housing independently of the connection of the heat wick between the optical subassembly and the transceiver housing.

15. An optical transceiver comprising:
a housing;
a circuit board configured to be received within the housing;
an optical subassembly having a can and a barrel, the optical subassembly mechanically supported on the housing and electrically coupled to the circuit board; and
a heat wick thermally coupled between the optical assembly and the housing, wherein the heat wick includes a sleeve and a flange, the sleeve configured to fit over the can of the optical subassembly and the flange configured to be coupled with the housing such that the can of the optical subassembly is thermally coupled directly to the housing, wherein the housing includes a recess into which the flange is configured to be received.

16. The optical transceiver of claim 15, further including a cover configured to fit over the flange and within the recess thereby retaining the flange within the recess.

* * * * *

UNITED STATES PATENT AND TRADEMARK OFFICE
CERTIFICATE OF CORRECTION

PATENT NO. : 7,308,206 B2  Page 1 of 1
APPLICATION NO. : 10/761106
DATED : December 11, 2007
INVENTOR(S) : Eric R. Larson It is certified that error appears in the above-identified patent and that said Letters Patent is hereby corrected as shown below:

Col. 2
Line 37 change "such a" to --such as a--

Col. 4
Line 20 change "view" to --viewed--

Col. 5
Line 52 change "and" to --an--

Col. 7
Line 5 delete "functions"

Col. 8
Line 10 change "an" to --and--

Signed and Sealed this

Twentieth Day of July, 2010

David J. Kappos
*Director of the United States Patent and Trademark Office*